(No Model.)
J. G. POOL.
CYCLOMETER.
No. 362,853. Patented May 10, 1887.
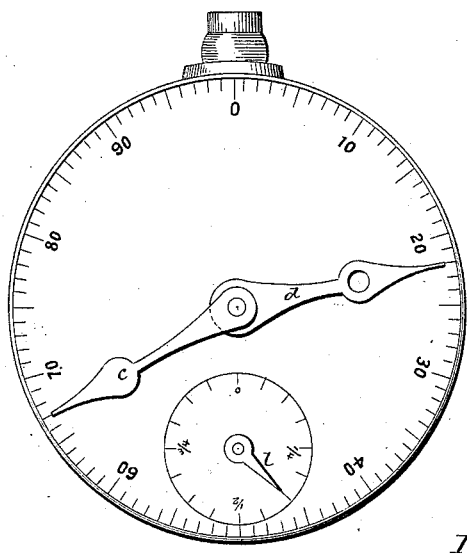
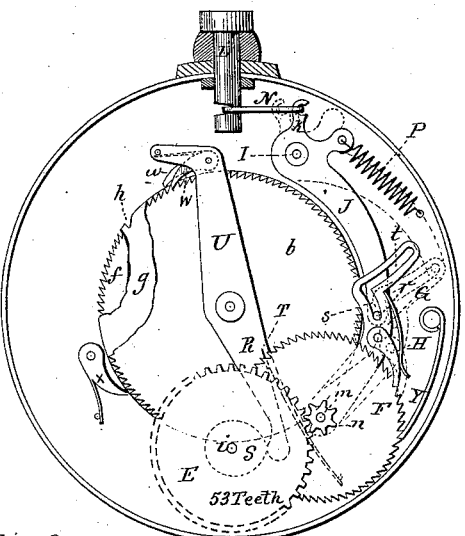
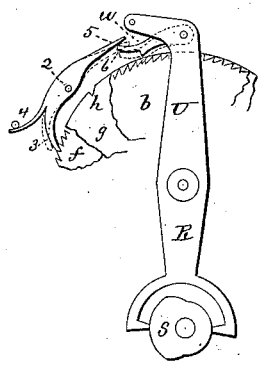
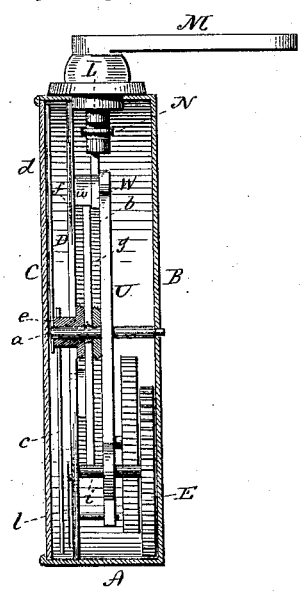
Witnesses.
J. H. Shumway
Fred C. Earle
J. George Pool, Inventor
By Atty.
John E. Earle

UNITED STATES PATENT OFFICE.

J. GEORGE POOL, OF MOUNT CARMEL, CONNECTICUT.

CYCLOMETER.

SPECIFICATION forming part of Letters Patent No. 362,853, dated May 10, 1887.

Application filed August 23, 1886. Serial No. 211,608. (No model.)

*To all whom it may concern:*

Be it known that I, J. GEORGE POOL, of Mount Carmel, in the county of New Haven and State of Connecticut, have invented a new Improvement in Cyclometers; and I do hereby declare the following, when taken in connection with accompanying drawings and the letters of reference marked thereon, to be a full, clear, and exact description of the same, and which said drawings constitute part of this specification, and represent, in—

Figure 1, a face view; Fig. 2, a rear view, the back removed, showing the mechanism, portions broken away for full illustration; Fig. 3, a vertical section of the case, showing side view of the apparatus, the center arbor in section; Fig. 4, a transverse section through the shaft L, showing the link-connection N; Fig. 5, a partial detached side view showing the brake, and also illustrating modifications of the count-lever.

This invention relates to a device to be attached to a bicycle or velocipede as a means for indicating the distance run by the machine, commonly called "cyclometer," the object being a simple construction, in which its mechanism is readily adapted to various diameters of driving-wheel, it being understood that the size of the driving-wheels varies in diameter by inches.

The case A, inclosing the mechanism, is of cylindrical shape, having a close back, B, and preferably a glass front, C, beneath which is the dial D. The glass front may be provided with the usual cover for protection, if desired. The center arbor, $a$, carries the first count-wheel, $b$. The arbor, extending through the dial, is provided with a pointer, $d$. This first count-wheel, $b$, is divided upon its periphery into one hundred teeth.

Upon the arbor $a$ is a tubular arbor, $e$, which carries the second count-wheel, $f$, having also one hundred teeth, and of substantially the same diameter as the first count-wheel, $b$. The arbor $e$ extends through the dial and carries a pointer, $c$. Fixed to the first count-wheel is a disk, $g$, of the same or slightly larger diameter than the second count-wheel, and preferably standing between the two count-wheels. This disk has in its periphery a single notch, $h$, corresponding to one tooth of the second count-wheel.

E is the mile-wheel—that is to say, a wheel which is adapted to revolve once in each mile. This wheel E is arranged upon an arbor, $i$, which extends through the dial and carries the mile-pointer $l$, eccentric to the arbors of the principal count-wheels, graduations being provided for the mile-wheel independent of the graduations for the first and second wheels, as seen in Fig. 1. The several arbors are supported in a frame-work, as seen in Fig. 3, and in like manner for supporting this class of mechanism. The wheel E has in its periphery fifty-three teeth.

Upon an arbor, $m$, parallel with the arbor $i$, is a pinion, $n$, having seven teeth arranged to work in the fifty-three teeth of the mile-wheel E. Fixed to the same arbor, $m$, is the feed-wheel F. It is from this wheel F that the feed is imparted, and the number of teeth upon its edge must be in proportion to the circumference of the driving-wheel, so that the mile-wheel shall revolve but once while the machine is traveling a mile; and that the apparatus may be readily adjusted to different-sized driving-wheels the proportion of the feed-wheel must be changeable with relation to the varying sizes of the driving-wheel, that the same result—that is, one revolution of the mile-wheel to each mile traveled—will be insured.

As the initial point from which to work, I take a fifty-inch driving-wheel, and find that with fifty-three teeth on the feed-wheel, with its pinion having seven teeth, and the mile-wheel having fifty-three teeth, one revolution of the mile-wheel for the fifty-inch driving-wheel will be attained, and that by reducing the feed-wheel one tooth for each inch increase in the diameter of the driving-wheel, or increasing the number of teeth of the feed-wheel one tooth for each one inch in diameter of the driving-wheel, will attain the same result—that is to say, for a fifty-one-inch driving-wheel the feed-wheel must have fifty-two teeth, for a fifty-two-inch wheel the feed-wheel must have fifty-one teeth, for a forty-nine-inch wheel the feed-wheel will have fifty-four teeth, and so on. The relative proportion, therefore, which I have described between the pinion and the gear of the mile-wheel, and with the fifty-three teeth on the feed-wheel, as the initial point, the increase or decrease in the size of the driving-wheel by inches will be made by a corresponding decrease or increase of teeth in the driving-wheel by one tooth for each inch variation in diameter of the driving-wheel from the said fifty-inch initial point.

Hung loosely upon the arbor $m$ of the feed-wheel is a lever, G, so as to swing concentric with the wheel F, and this lever carries a spring-pawl H, adapted to engage the teeth on the periphery of the wheel F under the swinging movement imparted to said lever G. Upon an arbor, I, a two-armed lever, J K, is hung to swing in a plane parallel with the plane of the feed-wheel and of its lever G. The longer arm extends to the lever G, and is provided with a stud, $r$, which works in a corresponding slot, $s$, in the lever G, and so that as the said arm J swings outward and inward it will impart a corresponding swinging movement to the lever G, the slot $s$ permitting the stud $r$ to work therein in such movement; and the length of the slot $s$ is such that the movement imparted by the arm J to the lever G will be sufficient to cause the pawl $h$, engaging a tooth of the wheel F, to impart a one-step movement to the said wheel F, such movement being indicated in broken lines, Fig. 2. At the upper end of the slot $s$ is a transverse slot, $t$, turned outward and curved concentric with the axis upon which the arm J turns, so that when the lever G has been turned to its extreme advanced position the stud $r$ will have passed through the slot $s$, and will then enter and work in the slot $t$ without effect upon the lever G; but upon the return of the arm J it will return the lever G and pass down to its normal position in the slot $s$.

Through the case is a shaft, L, arranged to oscillate by means of an arm, M, fixed to its outer end. This arm extends so far from the case that when the case is fixed, say, to the wheel, so as to revolve with the wheel, the arm will strike some fixed part of the machine once in each revolution of the wheel, or, if fixed to the machine, arranged so that some single point on the wheel will strike the arm M at each revolution, and under such operation the oscillatory movement is imparted to the shaft L. Within the case this shaft is constructed with a cam or eccentric, $u$, from which a link, N, extends into connection with the shorter arm, K, of the lever J K, as seen in Fig. 2. The lever J K is provided with a spring, P, the tendency of which is to draw the lever J K and the shaft L to their normal position or place of rest, and as seen in Fig. 2; but when the arm M is turned, as before described, the shaft L will be correspondingly turned, and by its cam will draw the link N, as indicated in broken lines, Fig. 4, and correspondingly turn the lever J K, as seen in broken lines, Fig. 2; but so soon as the arm M is free the reaction of the spring P will return the parts to their normal position. Thus at each revolution of the wheel the arm J is thrown outward, correspondingly moving the lever G, as seen in broken lines, Fig. 2, and under such movement the pawl H, engaging one of the teeth of the wheel F, will impart to that wheel one step in its rotation, and, so continuing, at each revolution the wheel F will be turned one tooth and the wheel E receive a corresponding intermittent movement through the pinion $n$ working therein, and because of the relation of the teeth of the wheel F, the pinion $n$, and of the wheel E, the wheel E revolves once in each mile run by the machine, it being understood, as before described, that before the cyclometer is applied to the machine a wheel, F, is introduced, the teeth of which correspond to the inches in diameter of the driving-wheel.

On the center arbor a lever is hung so as to swing free and independent of the count-wheels thereon. One arm, R, of this lever extends beside the wheel E, and so as to be acted upon by a cam, S, on the arbor $i$ on the wheel E, this cam being adapted to impart one full vibratory movement to the lever at each revolution. A spring, T, bears upon the arm R, so as to hold it yieldingly against the cam S. The other arm, U, of this lever extends to a point outside the periphery of the count-wheels, and carries a spring-pawl, W, which is adapted to work into the teeth of the first count-wheel; hence at each full vibration of the lever R U, imparted once in each mile, as before described, the count-wheel $b$ will be turned one tooth.

Upon the same axis as the pawl W a second pawl, $w$, is hung, the nose of which is equal in width to the width of the disk $g$ and the second count-wheel, $f$, as seen in Fig. 3, so that the nose rides upon the periphery of the disk, as seen in Fig. 2, and thus riding upon the smooth periphery of the disk, it is prevented from engagement with the teeth of the second count-wheel, so that while the pawl W is working in the teeth of the first count-wheel no effect is produced upon the second count-wheel; but as the first count-wheel completes a revolution, the pawl $w$ arrives at the notch $h$ in the disk $g$, and there is permitted, under the action of its spring, to fall into that notch and engage a corresponding tooth in the second count-wheel, $f$, and will at that time impart one tooth movement to the said second count-wheel; but in the next vibration the pawl $w$ escapes from the notch $h$ and again commences its ride over the smooth periphery of the disk $g$ independent of the wheel $f$. Supposing, therefore, the two count-wheels to have each one hundred teeth, a full revolution of the first count-wheel will indicate one hundred miles, at the end of each hundred miles the second count-lever will be turned one tooth, and the full revolution of the second wheel will indicate one hundred turns of the first count-wheel or ten thousand miles—the pointers of the mile-wheel on the dial indicating fractional parts of a mile, the pointer of the first count-wheel indicating single miles to the number of a hundred, and the pointer of the second count-wheel indicating the number of hundreds of miles.

A stop-dog, X, is hung to work in the teeth of the count wheel or wheels, and so as to prevent accidental or backward turning of the count-wheels, and a like stop-dog, Y, is provided for the feed-wheel F.

Under this construction of the cyclometer, and in which the pinion of the feed-wheel and the teeth of the mile-wheel bear the relation to each other which I have described, the device is applicable to machines of various diameters of driving-wheels, it only being necessary that the feed-wheel shall be according to the diameter of the wheel of the machine, as before described.

While the stop-dog may serve to arrest the accidental rotation of the second count-wheel, I prefer to lock that wheel so that it cannot be accidentally rotated, and this locking device I show detached in Fig. 5 for convenience of illustration.

The locking device consists of a dog hung upon a fulcrum, 2, its nose 3 adapted to engage the teeth of the second count-wheel under the action of a spring, 4. The tail 5 of the dog extends toward the pawl w, and from this pawl w a finger, 6, extends beneath the tail 5 of the dog, and so that as the pawl w is riding upon the periphery of the disk g the tail 5 of the dog will be raised and the nose 3 of the dog will be correspondingly held in a tooth of the count-wheel; but so soon as the pawl w drops into the notch h of the disk g, as indicated in broken lines, Fig. 5, then the dog is free, except as to the action of its spring, and will permit the count-disk to turn under the action of the pawl w; but so soon as the pawl w escapes from the notch h then the finger 6 of the pawl raises the tail of the dog and holds the nose in the next tooth on that wheel, and will so continue to do until, in the next revolution of the disk g, the notch h again permits the pawl w to drop and release the dog.

The count-lever R U may be made to act positively by constructing the arm R with a bifurcated end to embrace the cam S on the mile-wheel arbor, as seen in Fig. 5, and thus positively insure the proper return of the count-lever after having imparted the movement to the count-wheel.

In cases where a hundred miles is the extent of count required, the second count-wheel may be omitted, and in case a greater number of miles than ten thousand, as described, is required, an additional disk and count-wheel may be added, the said additional count-wheel having its pawl, the second disk, and count-wheel identical with the disk g, count-wheel f, and pawl w. This duplication of the count-wheels is an arrangement too well known to require illustration.

I claim—

1. In a cyclometer, the combination of the mile-wheel E, having fifty-three teeth, the feed-wheel F, carrying a pinion, n, of seven teeth, working into the fifty-three teeth of the mile-wheel, and the said feed-wheel having teeth in its periphery corresponding in number to the diameter of the driving-wheel, the initial diameter of the driving-wheel being fifty inches and the corresponding number of teeth in the feed-wheel being fifty-three and adapted to vary therefrom by one tooth for each successive inch variation in the diameter of the driving-wheel, the oscillating shaft L, having an arm extending therefrom, the said shaft provided with a cam, and the arrangement of levers and pawls, substantially such as described, between the cam of the said shaft and the teeth on the said feed-wheel, substantially as described.

2. In a cyclometer, the combination of the mile-wheel E, having fifty-three teeth, the feed-wheel F, carrying a pinion, n, of seven teeth, working into the fifty-three teeth of the mile-wheel, and the said feed-wheel having teeth in its periphery corresponding in number to the diameter of the driving-wheel, the initial diameter of the driving-wheel being fifty inches and the corresponding number of teeth in the feed-wheel being fifty-three and adapted to vary therefrom by one tooth for each successive inch variation in the diameter of the driving-wheel, mechanism, substantially such as described, to impart a step-by-step rotation to the said feed-wheel F, a cam, S, on the arbor of said mile-wheel, a count-wheel, b, and the count-lever R U, one arm carrying a pawl, W, working into the teeth of said count-wheel, the other arm arranged to engage the said cam on the mile-wheel, with an indicator in connection with said count-wheel, substantially as described.

3. In a cyclometer, the combination of the mile-wheel E, having fifty-three teeth, the feed-wheel F, carrying a pinion, n, of seven teeth, working into the fifty-three teeth of the mile-wheel, and the said feed-wheel having teeth in its periphery corresponding in number to the diameter of the driving-wheel, the initial diameter of the driving-wheel being fifty inches and the corresponding number of teeth in the feed-wheel being fifty-three and adapted to vary therefrom by one tooth for each successive inch variation in the diameter of the driving-wheel, a lever, G, hung upon the arbor of the feed-wheel, carrying a pawl, H, working in the teeth of said feed-wheel, the said lever constructed with a slot, s, a second two-armed lever, J K, the one arm, J, carrying a stud working in the said slot of the lever G, an oscillating shaft having an operating-arm extending therefrom, said shaft constructed with a cam, and a connection, N, between said cam on the oscillating shaft L and the arm K of the said lever, substantially as described.

4. In a cyclometer, the combination of the mile-wheel E, having fifty-three teeth, the feed-wheel F, carrying a pinion, n, of seven teeth, working into the fifty-three teeth of the mile-wheel, and the said feed-wheel having teeth in its periphery corresponding in number to the diameter of the driving-wheel, the initial diameter of the driving-wheel being fifty inches and the corresponding number of teeth in the feed-wheel being fifty-three and adapted to vary therefrom by one tooth for each successive inch variation in the diameter of the driving-wheel, mechanism, substantially such as described, to impart a step-by-step rotation to the said feed-wheel F, a cam, S, on the arbor of said mile-wheel, a count-wheel, b, and the count-lever R U, one arm carrying a pawl, W, working into the teeth of said count-wheel, the other arm arranged to engage the said cam on the mile-wheel, with a second toothed count-wheel, f, disk g, having a single notch, h, in its periphery, and fixed to the first count-wheel, a second pawl, w, hung upon the count-lever, its nose working over both the periphery of the said disk and of the said second count-wheel, the said count-wheels each provided with independent indicators, substantially as described.

5. In a cyclometer, the combination of the mile-wheel E, having fifty-three teeth, the feed-wheel F, carrying a pinion, n, of seven teeth, working into the fifty-three teeth of the mile-wheel, and the said feed-wheel having teeth in its periphery corresponding in number to the diameter of the driving-wheel, the initial diameter of the driving-wheel being fifty-three inches, and the corresponding number of teeth in the feed-wheel being fifty-three and adapted to vary therefrom by one tooth for each successive inch variation in the diameter of the driving-wheel, mechanism, substantially such as described, to impart a step-by-step rotation to the said feed-wheel F, a cam, S, on the arbor of said mile-wheel, a count-wheel, b, and the count-lever R U, one arm carrying a pawl, W, working into the teeth of said count-wheel, the other arm arranged to engage the said cam on the mile-wheel, with a second toothed count-wheel, f, disk g, having a single notch, h, in its periphery, and fixed to the first count-wheel, a second pawl, w, hung upon the count-lever, its nose working over both the periphery of the said disk and of the said second count-wheel, a dog hung upon a fulcrum, 4, its nose adapted to engage the teeth of said second count-wheel, and the pawl w, constructed with a finger, 6, arranged to work beneath the tail 5 of the dog, substantially as and for the purpose described.

J. GEORGE POOL.

Witnesses:
WM. M. BAMBERG,
C. CLIFFORD JAMES.